United States Patent Office 2,729,416
Patented Jan. 3, 1956

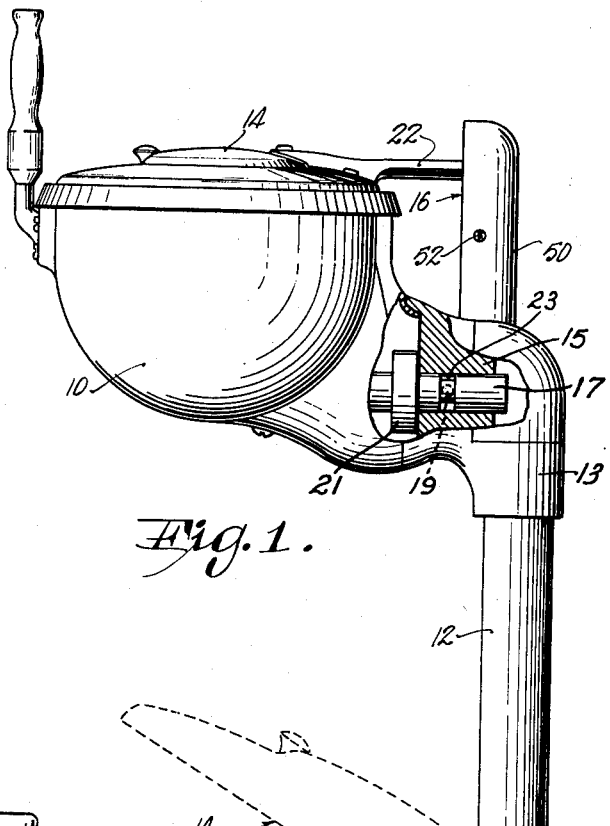
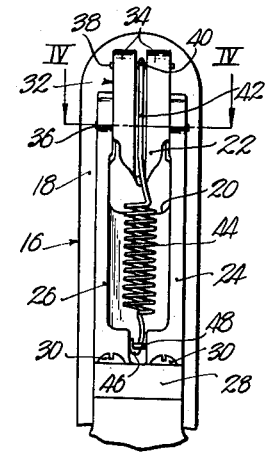
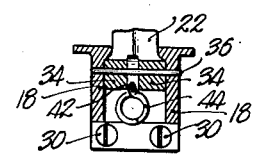
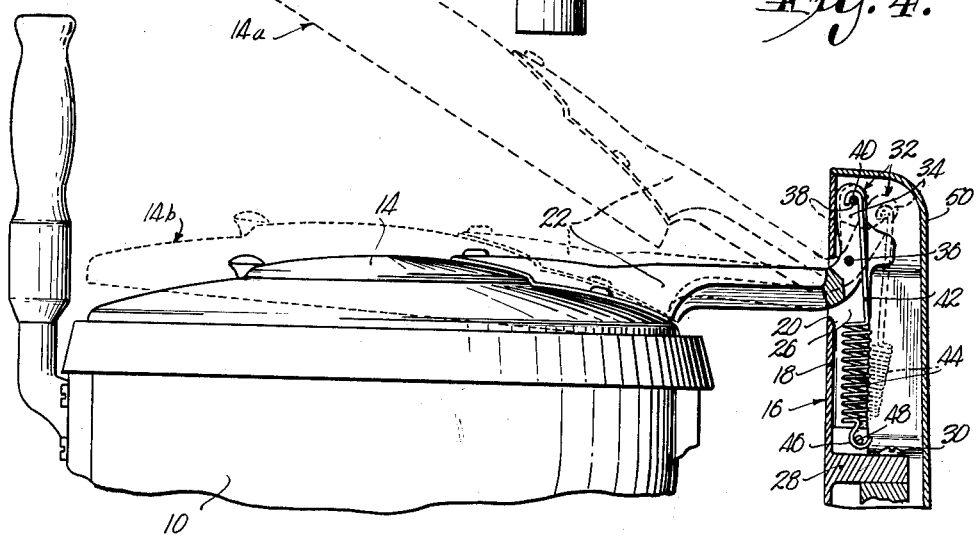
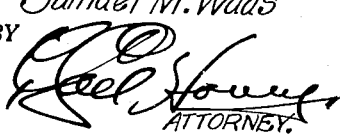
Jan. 3, 1956 — S. M. WAAS — 2,729,416
SPRING CONTROLLED LID FOR POPCORN KETTLES
Filed Jan. 14, 1952
Fig. 1.
Fig. 2.
Fig. 4.
Fig. 3.
INVENTOR.
Samuel M. Waas
BY
ATTORNEY.

2,729,416
SPRING CONTROLLED LID FOR POPCORN KETTLES

Samuel M. Waas, Kansas City, Mo., assignor to Manley, Inc., Kansas City, Mo., a corporation of Missouri Application January 14, 1952, Serial No. 266,397

2 Claims. (Cl. 248—292)

This invention relates to corn popping machines and particularly to the kettle construction thereof, the primary object being to provide a novel control in the nature of a spring for automatically swinging the lid of the kettle to a fully open position after the lid has been partially opened by the popped corn in the kettle against the action of gravity.

This is a continuation-in-part of my co-pending application, Serial No. 205,982, filed January 15, 1951, and entitled "Lid Assembly for Popcorn Kettles."

It is an object hereof to provide a substantially L-shaped arm for swingably mounting the lid of a popcorn kettle on a suitable vertical support, together with spring means coupled with one leg of the arm to automatically swing the lid to an open position.

Another object hereof is to provide a spring-loaded lid for popcorn kettles wherein the spring operates only to swing the lid open after the latter has moved to a predetermined point above the fully closed position and having no effect upon maintaining the lid closed, the latter action being by force of gravity only.

Other objects include details of construction, all of which will be made clear as the following specification progresses.

In the drawing:

Figure 1 is a side elevational view of a kettle unit for corn popping machines having a spring controlled lid made pursuant to the present invention, parts being broken away and in section to reveal details of construction.

Fig. 2 is a rear elevational view with a portion of the housing removed showing the control mechanism only as the same appears when the lid is closed.

Fig. 3 is a fragmentary, side elevation view, parts being in section and illustrating the various positions of the lid; and Fig. 4 is a fragmentary, detailed, cross-sectional view taken on line IV—IV of Fig. 2.

Popcorn kettle 10 is mounted for swinging movement on a horizontal axis and upon a vertical support or pedestal 12 extending downwardly from the point of pivotal connection with the kettle 10. Such swinging movement of kettle 10 is provided to permit emptying of its contents and is separate from the lid 14 thereof, it being necessary to open the latter to the dash-line position shown in Fig. 3 of the drawing and indicated by the numeral 14a, before the kettle 10 can be thus swung on the pedestal 12.

The structure permitting swinging movement of the kettle 10 about a horizontal axis, comprises, generally, a shaft 17 rigidly attached to the kettle 10 and rotatable within bearing 15 in upper section 13 of supporting tube 12. Shaft 17 has a flange 21 limiting the extent of movement thereof within bearing 15 in one direction. A retractable plunger 19 fits within annular groove 23 of shaft 17 to limit movement of the shaft 17 and kettle 10 away from bearing 15. When plunger 19 is retracted, shaft 17 and kettle 10 can be removed from tube 12 for cleaning or repair. A ball detent (not shown), is provided between bearing 15 and shaft 17 for maintaining shaft 17 and kettle 10 normally in the upright position shown in Fig. 1, which ball detent is yieldable to the pressure required to swing kettle 10 about the axis of shaft 17.

An elongated, vertical support 16 includes a front plate 18 provided with an opening 20 for clearing a swingable, L-shaped arm 22 that passes through opening 20 and is secured to the lid 14. A pair of elongated, vertical ribs 24 and 26 on the rearmost face of the plate 18 is joined at the lowermost ends thereof by a base portion 28 that is in turn secured to the pedestal 12 by screws or the like 30.

The arm 22 includes an elongated leg having a lateral projection 32 on that end thereof, remote from the lid 14, that is bifurcated to present a pair of spaced, identical ears or fingers 34, it being noted that the fingers 34 are substantially vertical when the lid 14 is closed. The arm 22 is pivotally connected to the support 16 by means of a transverse pin 36 passing through the ribs 24 and 26 and adjacent the lowermost ends of the fingers 34. A second pin 38 joins the fingers adjacent the uppermost free ends thereof for receiving hook 40 on an end length 42 forming a part of a coil spring 44, the end length or stem 42 of spring 44 moving within the space between the fingers 34 as the lid 14 swings to and from the closed position respectively. The lowermost end of the spring 44 has a hook 46 that is looped over a third cross pin 48, passing through the ribs 24 and 26. It is to be noted that when the lid 14 is closed, spring 44 is disposed substantially between the ribs 24 and 26 and the pins 36, 38 and 48 are in substantial alignment when the lid 14 is closed.

It is notable further that as the lid 14 swings to and from the closed position, spring 44 moves toward and away from the rearmost face of the plate 18. A housing 50 enclosing the ribs 24 and 26 to which it is removably attached by screws or the like 52, completely encloses the spring 44, the projection 32 and the base portion 28.

The spring 44 operates only to move the lid 14 from dotted line position 14 in Fig. 3, to the fully open position 14a, the action of gravity alone serving to maintain the lid 14 in the closed position. As soon as the level of popped corn in the kettle 10 rises to a position acting upon the lid 14 to overcome the force of gravity, and raise lid 14 to position 14b, spring 44 automatically operates to snap the lid 14 to the fully open position 14a. Arm 22 strikes the uppermost end of the opening 20, and limits the extent of upward swinging movement of the lid 14. At no time will lid 14 remain in any intermediate position between the fully open position 14a and the fully closed position. When no force is provided to hold the lid 14 elevated between the fully closed position and the partially open position 14b, it will fall to the closed position. Likewise, and conversely, in any position between positions 14a and 14b, the spring 44 operates or acts upon the lid 14. When the lid 14 is in the closed position, the fingers 34 bear against the innermost face of the plate 18 above the ribs 24 and 26 and thus, the necessity of lid 14 actually engaging the kettle 10 when lid 14 is closed, may be eliminated if desired. Furthermore, projection 32 striking the plate 18, prevents spring 44 from acting upon the lid 14 in an off-center manner, and thus gravity alone is relied upon to hold the lid 14 in the closed position.

Having thus described my invention, what I claim as new and desire to secure by Letters Patent is:

1. In a popcorn machine having a support, an open top kettle mounted on the support for swinging movement on a horizontal axis to and from a dumping position, and a lid normally disposed in a closed position over the open top of said kettle by gravitational force, structure for mounting the lid for swinging movement to and from an open position spaced from the kettle, permitting swinging of the latter to said dumping position, said structure comprising an elongated arm; means securing the arm to said lid; a first pin on the support mounting the arm for swinging movement on a horizontal axis; an elongated coil spring having its longitudinal axis substantially perpendicular to the longitudinal axis of the arm and substantially vertical when the lid is closed; fastening means securing one end of the spring to the support; a stem on the opposite end of the spring, said first pin being disposed between the stem and the lid; a second pin mounted on the arm in spaced parallelism to the first pin for swinging movement with the arm on an arc concentric to the axis of said first pin; and means pivotally connecting the stem to the second pin for swinging movement of the stem toward and away from the first pin as the lid swings toward and away from the closed position respectively, said first pin being disposed between said fastening means and the second pin substantially within a vertical line passing through said axis of the spring and joining the fastening means and the second pin when the lid is closed, said spring being longitudinally stretched when the lid is closed, whereby on slight movement of the lid away the kettle, the spring will swing the lid to a fully open position.

2. In a popcorn machine having a support, an open top kettle mounted on the support for swinging movement on a horizontal axis to and from a dumping position, and a lid normally disposed in a closed position over the open top of said kettle by gravitational force, structure for mounting the lid for swinging movement to and from an open position spaced from the kettle, permitting swinging of the latter to said dumping position, said structure comprising an L-shaped arm having an elongated leg and a pair of spaced, upturned ears on one end of the leg; means securing the leg at its opposite end to the lid; a first pin on the support traversing the ears for mounting the arm for swinging movement on a horizontal axis; an elongated coil spring beneath the ears, having its longitudinal axis substantially perpendicular to the longitudinal axis of the leg and substantially vertical when the lid is closed; fastening means securing one end of the spring to the support; a stem on the opposite end of the spring and between said ears, said first pin being disposed between the stem and the lid; a second pin traversing said ears above the first pin, in spaced parallelism to the first pin and secured to the ears for swinging movement with the ears on an arc concentric to the axis of said first pin; and means pivotally connecting the stem to the second pin for swinging movement of the stem toward and away from the first pin as the lid swings toward and away from the closed position respectively, said first pin being disposed between said fastening means and the second pin substantially within a vertical line passing through said axis of the spring and joining the fastening means and the second pin when the lid is closed, said spring being longitudinally stretched when the lid is closed, whereby on slight movement of the lid away from the kettle, the spring will swing the lid to a fully open position.

References Cited in the file of this patent
UNITED STATES PATENTS

| | | |
|---|---|---|
| 1,020,437 | Nelson | Mar. 19, 1912 |
| 1,721,308 | Lormor | July 16, 1929 |
| 1,930,841 | Miniere | Oct. 17, 1933 |
| 2,209,693 | Hammell | July 30, 1940 |
| 2,500,057 | Borgerd | Mar. 7, 1950 |